United States Patent
Kamijo

[11] Patent Number: 5,617,345
[45] Date of Patent: Apr. 1, 1997

[54] LOGICAL OPERATION CIRCUIT AND DEVICE HAVING THE SAME

[75] Inventor: Shunsuke Kamijo, Kawasaki, Japan

[73] Assignee: Fujitsu Limited, Kawasaki, Japan

[21] Appl. No.: 518,715

[22] Filed: Aug. 24, 1995

[30] Foreign Application Priority Data

Sep. 29, 1994 [JP] Japan ................... 6-235735

[51] Int. Cl.⁶ ............... G06F 7/52; G06F 7/50
[52] U.S. Cl. ...................... 364/754; 364/784
[58] Field of Search ................... 364/754, 757, 364/784, 786

[56] References Cited

U.S. PATENT DOCUMENTS 4,970,677  11/1990  Young ........................ 364/784
5,504,915  4/1996  Rarick ........................ 364/754

FOREIGN PATENT DOCUMENTS 1-103737   4/1989   Japan.
3-177922   8/1991   Japan.
3-271931  12/1991   Japan.
6-110657   4/1994   Japan.

Primary Examiner—Tan V. Mai
Attorney, Agent, or Firm—Staas & Halsey

[57] ABSTRACT

A logical operation circuit performing a logic operation on inputs includes a plurality of adders arranged in a tree structure. The plurality of adders includes first-type adders and second-type adders. The first-type adders are adders which receive positive-logic inputs and output negative-logic outputs. The second-type adders are adders which receive negative-logic inputs and output positive-logic outputs.

10 Claims, 10 Drawing Sheets

LOGICAL OPERATION CIRCUIT AND DEVICE HAVING THE SAME

BACKGROUND OF THE INVENTION

1. Field of the Invention

The present invention generally relates to logical operation circuits, and more particularly to a logical operation circuit related to a Wallence tree circuit used for an operation such as a multiplying operation in order to speed up the operation in a computation unit.

2. Description of the Prior Art

A Wallence tree circuit is conventionally employed in a computation unit such as a computer in order to speed up the operation of a logical operation unit such as a multiplier.

FIG. 1 is a block diagram of an adder having a Wallence tree circuit used for multiplication. The Wallence tree adder shown in FIG. 1 performs an adding operation on seven operands, each of which consists of N bits (digits) where N is an arbitrary integer. The circuit shown in FIG. 1 includes N adders $21_1$–$21_N$, and a single adder 22 such as a carry propagation adder (usually abbreviated as CPA). The N adders $21_1$–$21_N$ respectively correspond to the N digits, and perform adding operations on the respective digits. Then, the adders $21_1$–$21_N$ output sum signals and carry signals. For example, the adder $21_1$ performs the adding operation on first digits $D1_1$–$D7_1$ of the seven operands, and outputs a sum signal $SUM_1$ and a carry signal $CRY_1$. A plurality of carry signals or bits are generated in the operation of the adder $21_1$, and are applied to the adder $21_2$. The adder $21_2$ utilizes the received carry signals in its own adding operation. The adder 22 receives the sum signals $SUM_1$–$SUM_N$ and carry signals $CRY_1$–$CRY_N$ from the adders $21_1$–$21_N$, respectively, and outputs operation results $S_1$–$S_N$.

FIG. 2 is a block diagram of the structure of each of the adders $21_1$–$21_N$. For the convenience sake, FIG. 2 shows a structure related to the nth digit and the (n+1)th digit where 1<n and n+1<N). As shown in FIG. 2, each of the adders $21_1$–$21_N$ includes a Wallence tree circuit in which a plurality of one-bit full adders FA1 are connected so as to form a tree. Each of the full adders FA1 has three inputs and two outputs. The above tree structure improves the adding operation and the operation speed, as compared with an ordinary sequential operation in which an operand is added to the result of an operation on which two operands are added.

The structure shown in FIG. 2 has four stages of full adders FA1 extended in the signal propagating direction. This structure makes a seven-input/two-output circuit configuration. For example, the structure receives the seven inputs $D1_n$–$D7_n$ and outputs two outputs $SUM_n$ and $CRY_n$. The carry signals generated at the respective stages except for the final stage are propagated to the next digit. For example, four carry signals generated at the (n−1)th digit are applied to three full adders FA1 of the nth digit, as shown in FIG. 2.

FIG. 3 is a block diagram of the three-input/two-output one-bit full adder FA1 used to form the adders $21_1$–$21_N$. The full adder FA1 is made up of two exclusive-OR (EX-OR) circuits 11 and 12, and three NAND circuits 13, 14 and 15. Inputs DIN1, DIN2 and DIN3 are applied, as shown in FIG. 3. The sum result SUM and the carry CRY are respectively output from the exclusive-OR circuit 12 and the NAND circuit 14. For example, when DIN1=DIN2=DIN3=1, then SUM=1 and CRY=1. When DIN1=DIN2=1, and DIN3=0, then SUM=0 and CRY=1. As described above, the full adder FA1 is of a positive-logic input/positive logic output type.

However, the above-mentioned prior art has the following disadvantages.

Normally, 32 field effect transistors are needed to form the one-bit full adder FA1 by CMOS circuits. More particularly, each of the exclusive-OR circuits 11 and 12 is made up of 10 transistors, and each of the three NAND circuits 13–15 is made up of four transistors. The Wallence tree circuit uses a plurality of full adders FA1 as described above, and has a large circuit size. The multiplier is mostly configured by Wallence tree circuits as shown in FIG. 1, and needs a large area on a chip.

The critical path of the full adder FA1 includes the exclusive-OR circuit 11, the NAND circuit 13 and the NAND circuit 14. It takes a long time for a signal to be propagated through the critical path. The Wallence tree circuit utilizes a plurality of full adders as described above, and thus a large delay occurs therein.

SUMMARY OF THE INVENTION

It is a general object of the present invention to provide a logical operation circuit in which the above disadvantages are eliminated.

A more specific object of the present invention is to provide a logical operation circuit which has a smaller size and a decreased delay in signal propagation.

The above objects of the present invention are achieved by a logical operation circuit configured as follows. The logical operation circuit performing a logic operation on inputs includes a plurality of adders arranged in a tree structure. The plurality of adders includes first-type adders and second-type adders. The first-type adders are adders which receive positive-logic inputs and output negative-logic outputs. The second-type adders are adders which receive negative-logic inputs and output positive-logic outputs.

The first-type and second-type adders can be formed by field effect transistors such as CMOS (Complementary Metal Oxide Semiconductor) transistors. The basic structure of CMOS circuits is an inverter. In the conventional art, in order to perform an operation on positive-logic to input and outputs positive-logic outputs, a circuit is configured by CMOS circuits such that the circuit receives positive-logic inputs and outputs positive-logic outputs. On the other hand, according to the above structure of the present invention, it is possible to configure the circuit by unitizing the nature of CMOS circuits. Hence, it is possible to form the circuit by means of a smaller number of transistors. The circuit operates at a higher speed with a smaller delay and occupies a smaller area on a chip or a circuit board.

It is also an object of the present invention to provide a device having the abovedescribed circuit.

This object of the present invention is achieved by a device comprising a multiplier, and buses via which data is applied to the multiplier and data is output from the multiplier. The multiplier performs a multiplying operation on the data. The multiplier includes a plurality of adders arranged in a tree structure. The plurality of adders includes first-type adders and second-type adders. The first-type adders are adders which receive negative-logic inputs and output positive-logic outputs. The second-type adders are adders which receive positive-logic inputs and output negative-logic outputs.

BRIEF DESCRIPTION OF THE DRAWINGS

Other objects, features and advantages of the present invention will become more apparent from the following detailed description when read in conjunction with the accompanying drawings, in which.

DESCRIPTION OF THE PREFERRED EMBODIMENTS

Figure 4A:
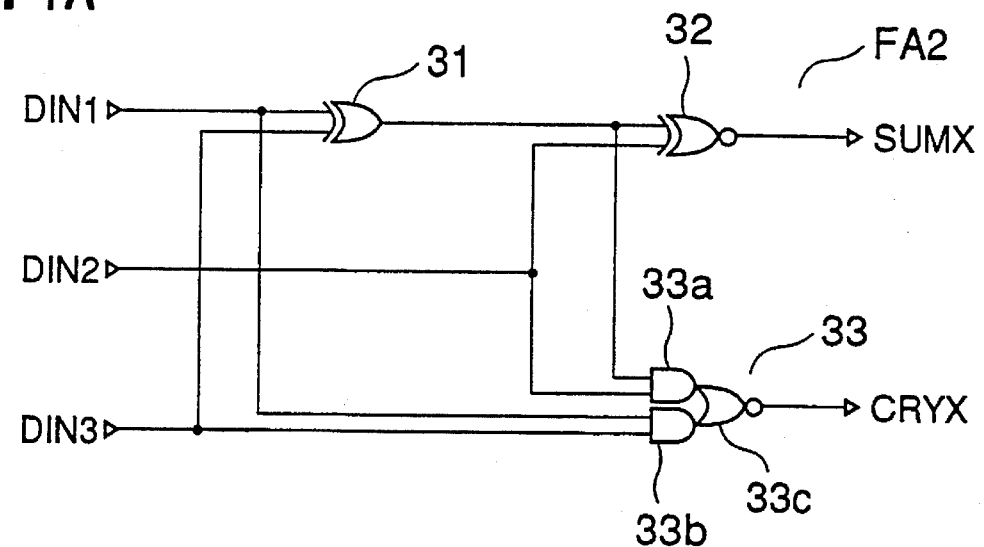
FIG. 4A is a block diagram of a first-type adder according to a first embodiment of the present invention.
Figure 4B:
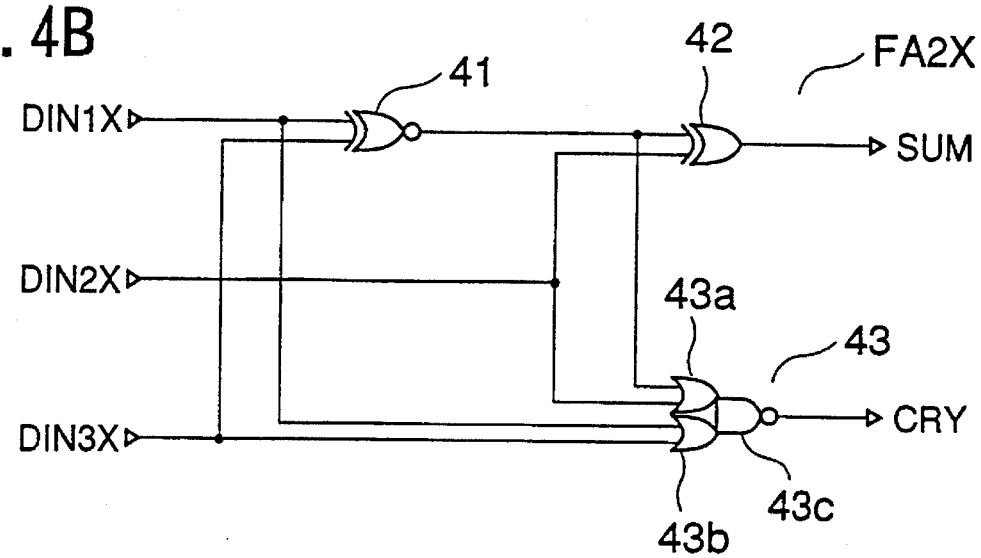
FIG. 4B is a block diagram of a second-type adder according to the first embodiment of the present invention.

FIGS. 4A and 4B are block diagrams of two types of one-bit adders according to a first embodiment of the present invention. More particularly, FIG. 4A is a positive-logic-input/negative-logic output one-bit full adder FA2, and FIG. 4B is a negative-logic-input/positive-logic output one-bit full adder FA2X.

The full adder FA2 shown in FIG. 4A is made up of an exclusive-OR circuit 31, an exclusive-NOR circuit 32, and a composite gate 33. The composite gate 33 is made up of two AND circuits 33a and 33b, and a NOR circuit 33c.

These circuits are connected as follows. An input terminal DIN1, which is a positive logic input, is connected to the exclusive-OR circuit 31 and the AND circuit 33b. An input terminal DIN2, which is a positive logic input, is connected to the exclusive-NOR circuit 32 and the AND circuit 33a. An input terminal DIN3, which is a positive logic input, is connected to the exclusive-OR circuit 31 and the AND circuit 33b. The output terminal of the exclusive-OR circuit 31 is connected to the input of the exclusive-NOR circuit 32 and the input of the AND circuit 33a. The AND circuits 33a and 33b are connected to the input terminals of the NOR circuit 33c. A sum result SUMX, which is a negative-logic output, is the output of the exclusive-NOR circuit 32, and a carry signal CRYX, which is a negative-logic output, is the output of the composite gate circuit 33.

When DIN1=DIN2=DIN3=1, then SUMX=CRYX=0. When DIN1=DIN2=DIN3=0, then SUMX=CRYX=1.

The one-bit full adder FA2X, which is of the negative-logic-input/positive-logic output type, is made up of an exclusive-NOR circuit 41, an exclusive-OR circuit 42, and a composite gate circuit 43. The composite gate circuit 43 is made up of two OR circuits 43a and 43b, and one NAND circuit 43c.

These circuits are connected as described below. An input terminal DIN1X, which is a negative logic input, is connected to the exclusive-NOR circuit 41 and the OR circuit 43b. A negative input terminal DIN2X, which is a negative logic input, is connected to the exclusive-OR circuit 42 and the OR circuit 43a. A negative-logic input-terminal DIN3X, which is a negative logic input, is connected to the exclusive-NOR circuit 41 and the OR circuit 43b. The output terminal of the exclusive-NOR circuit 41 is connected to the input of the exclusive-OR circuit 42 and the input of the OR circuit 43a. The OR circuits 43a and 43b are connected to the input terminals of the NAND circuit 43c. A sum result SUM, which is the positive-logic output, is the output of the exclusive-OR circuit 42. A carry signal CRY, which is a positive-logic output, is the output of the composite gate circuit 43.

When DIN1X=DIN2X=DIN3X=1, then SUMX=CRYX=0. When DIN1X=DIN2X=DIN3X=0, then SUM=CRY=1.

Figure 5:
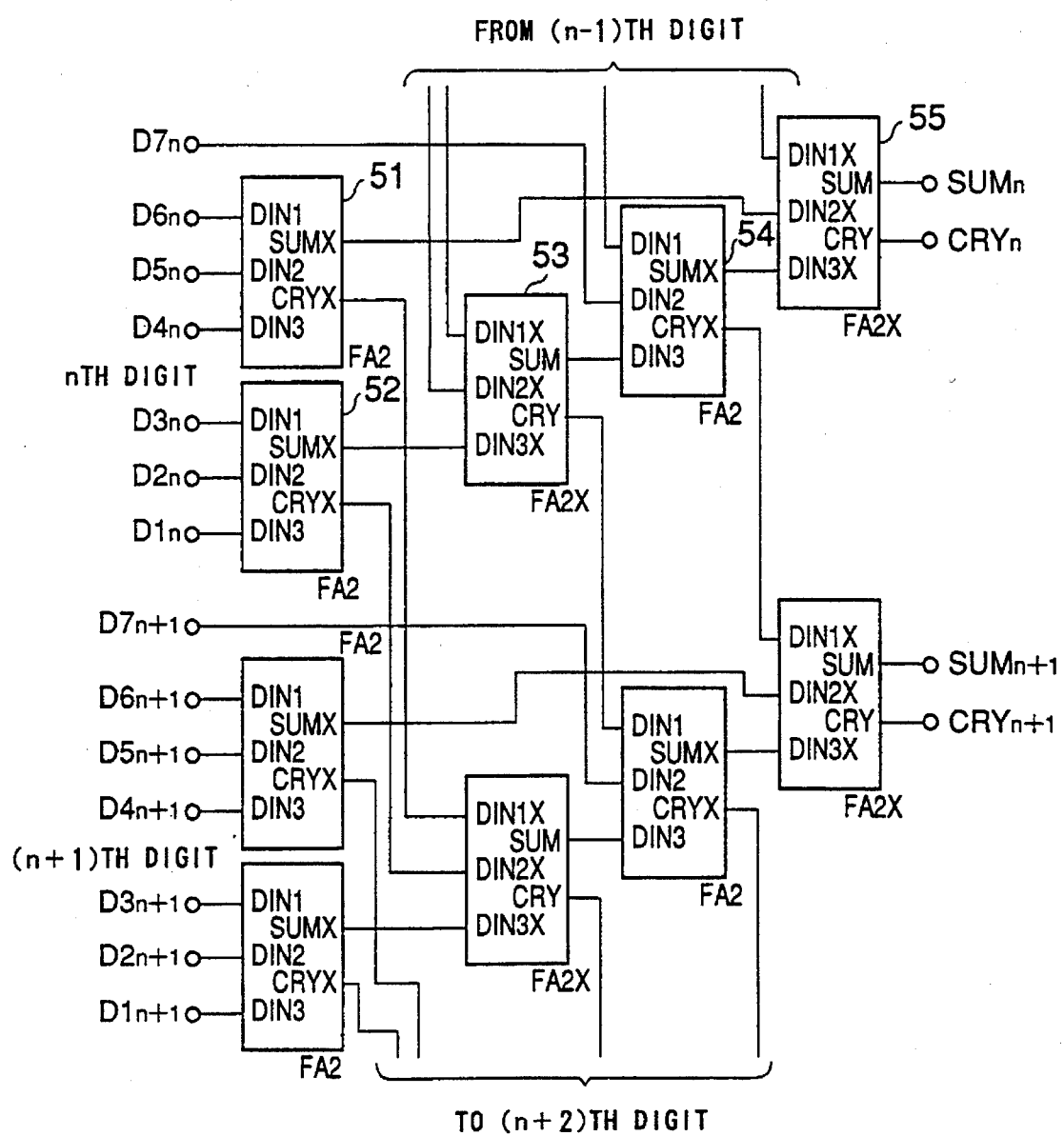
FIG. 5 is a block diagram of a Wallence tree circuit utilizing the adders shown in FIGS. 4A and 4B.

According to the first embodiment of the present invention, a Wallence tree circuit can be configured using two types of one-bit adders, as shown in FIG. 5. More particularly, FIG. 5 shows a structure related to the nth and (n+1)th digits of a Wallence tree adder, as in the case of FIG. 2. The nth-digit structure includes three one-bit full adders (FA2) 51, 52 and 54 of the positive-logic-input/negative-logic-output type, and two one-bit full adders (FA2X) 53 and 55 of the negative-logic-input/positive-logic-output type. The full adders 51 and 52 of the first stage receive bits $D1_n$–$D6_n$ of the nth digits out of seven operands. The full adder 53 of the second stage receives the output of the full adder 52 and two carry signals from the (n−1)th digits. The full adder 54 of the third stage receives the output signal of the full adder 53, one carry signal from the (n−1)th digits and the bit $D7_n$. The full adder 55 of the fourth stage receives the outputs of the full adders 51 and 54, and one carry signal from the (n−1)th digits., and outputs the sum result $SUM_n$ and the carry signal $CRY_N$. The structures for the other digits are configured in the same way as the above structure for the nth digit.

Figure 1:
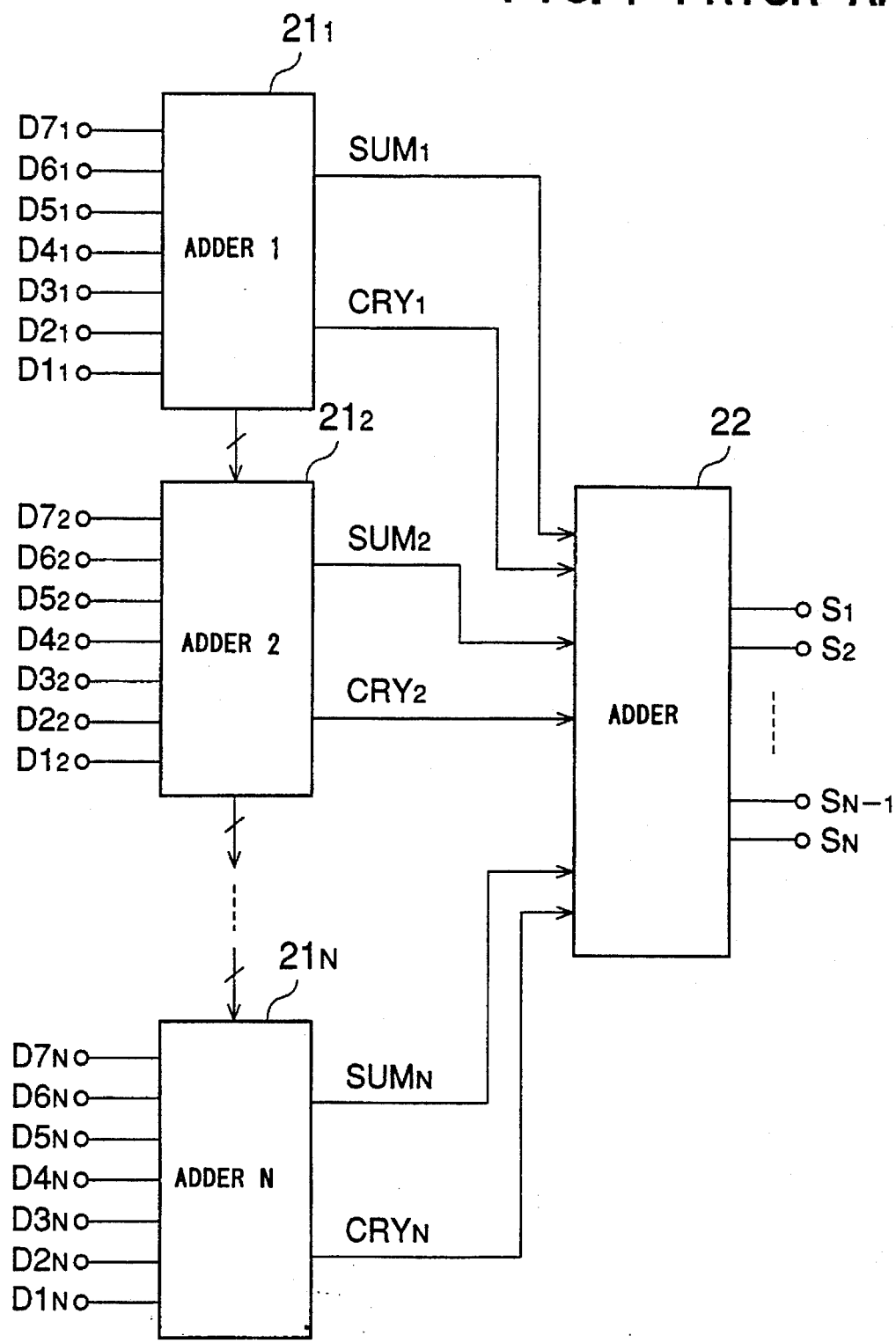
FIG. 1 is a block diagram of a conventional adder having a Wallence tree structure.
Figure 2:
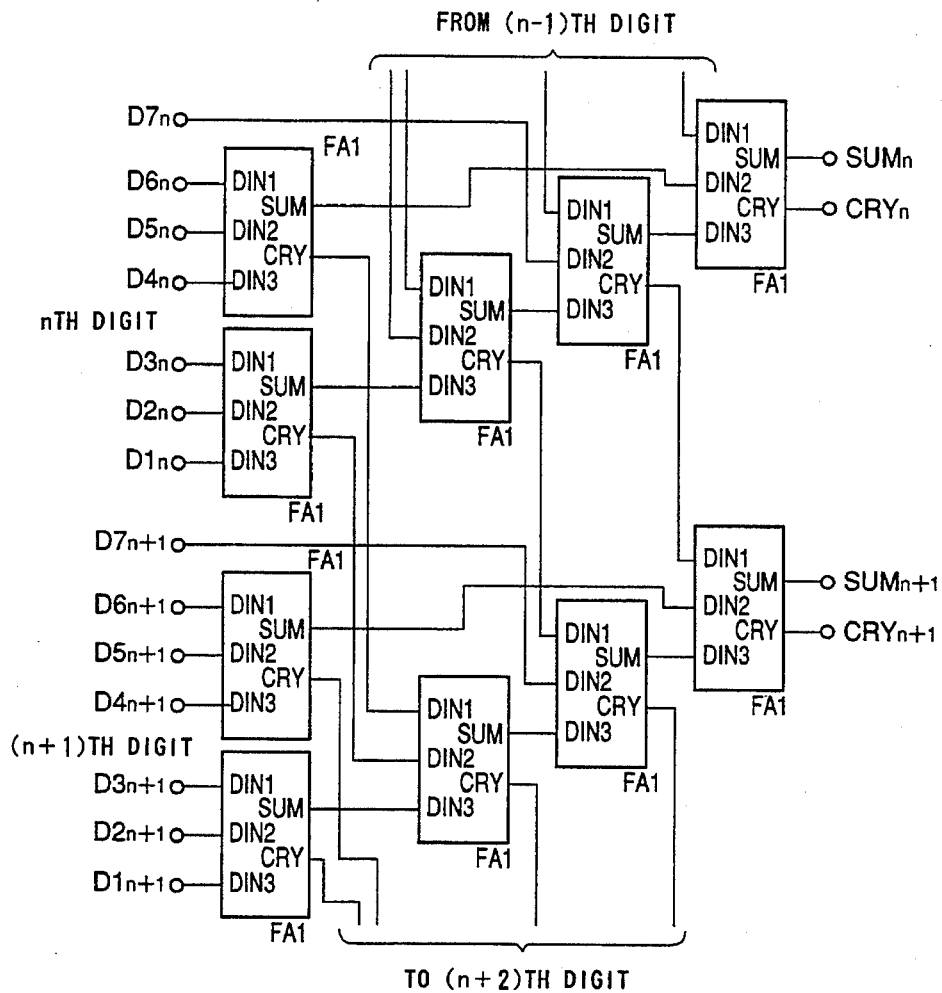
FIG. 2 is a block diagram of a one-bit full adder used in the Wallence tree structure shown in FIG. 1.

The values of the $SUM_n$ and carry signal $CRY_n$ are the same as those obtained in the structure shown in FIG. 2.

When the circuits shown in FIGS. 4A and 4B are formed by CMOS circuits, each of the exclusive-OR circuit 31 and the exclusive-NOR circuit 32 is formed by 10 field effect transistors. Further, the composite gate circuit 33 is formed by eight transistors. Hence, the circuit shown in FIG. 4A can be formed by 28 transistors. Similarly, the circuit shown in FIG. 4B can be formed by 28 transistors. The critical path of the circuit shown in FIG. 4A includes the circuits 31 and 33, and the critical path of the circuit shown in FIG. 4B includes the circuits 41 and 43. Each of the above critical paths includes 18 transistors. As compared with the case utilizing full adders shown in FIG. 2, use of the two types of full adders reduces both the circuit size and a delay in signal propagation.

The above advantages of the present invention will be described below in more detail.

Figure 6A:
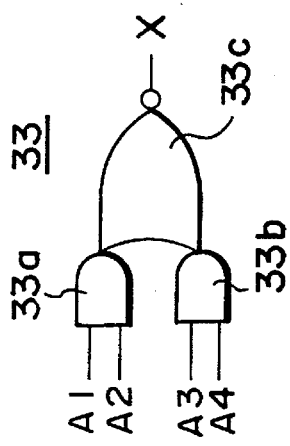
FIG. 6A is a block diagram of a composite gate circuit shown in FIG. 4A.
Figure 6B:
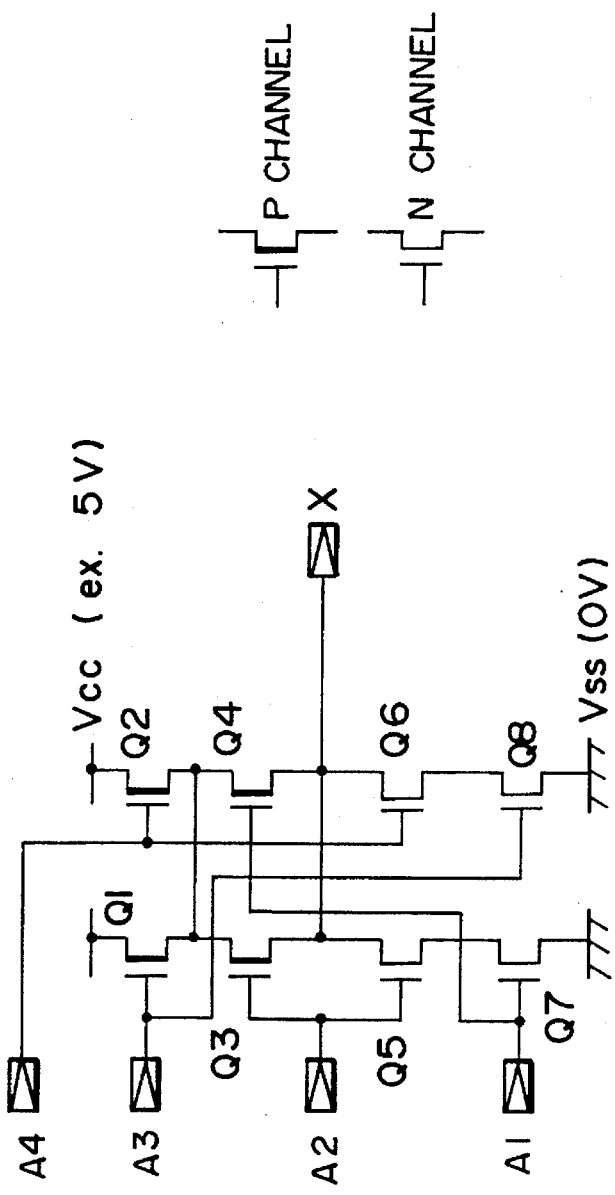
FIG. 6B is a circuit diagram of the composite gate circuit shown in FIG. 6A.

FIG. 6A is a block diagram of the composite gate circuit 33 shown in FIG. 4A, and FIG. 6B is a circuit diagram of the composite gate circuit 33. As shown in FIG. 6B, the composite gate circuit 33 is made up of eight field effect transistors such as MOS transistors Q1–QS.

Table 1 is a truth table of the composite circuit 33 in which "1" corresponds to Vcc shown in FIG. 6B equal to, for example, 5 V, and "0" corresponds to Vss equal to, for example, 0 V.

TABLE 1

| Input | | | | Output |
|---|---|---|---|---|
| A1 | A2 | A3 | A4 | X |
| 1 | 1 | 1 | 1 | 0 |
| 1 | 1 | 1 | 0 | 0 |
| 1 | 1 | 0 | 1 | 0 |
| 1 | 1 | 0 | 0 | 0 |
| 1 | 0 | 1 | 1 | 0 |
| 1 | 0 | 1 | 0 | 1 |
| 1 | 0 | 0 | 1 | 1 |
| 1 | 0 | 0 | 0 | 1 |
| 0 | 1 | 1 | 1 | 0 |
| 0 | 1 | 1 | 0 | 1 |
| 0 | 1 | 0 | 1 | 1 |
| 0 | 1 | 0 | 0 | 1 |
| 0 | 0 | 1 | 1 | 0 |
| 0 | 0 | 1 | 0 | 1 |
| 0 | 0 | 0 | 1 | 1 |
| 0 | 0 | 0 | 0 | 1 |

Figure 7A:
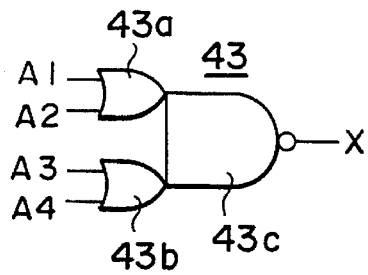
FIG. 7A is a block diagram of a composite gate circuit shown in FIG. 4B.
Figure 7B:
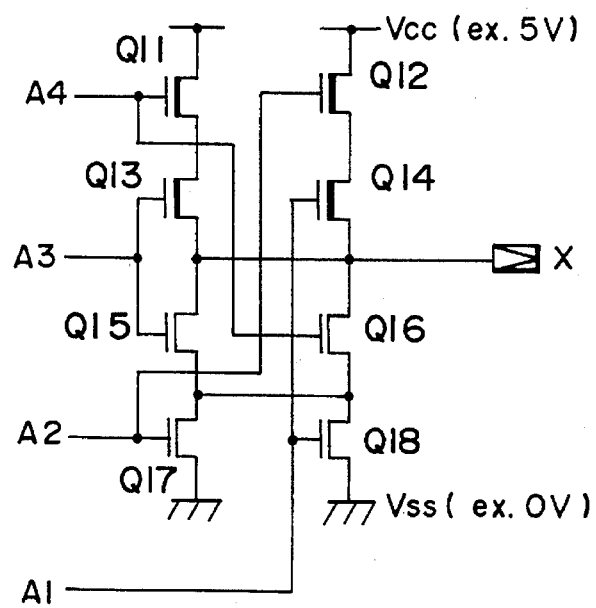
FIG. 7B is a circuit diagram of the composite gate circuit shown in FIG. 7A.

FIG. 7A is a block diagram of the composite gate circuit 43 shown in FIG. 4B, and FIG. 7B is a circuit diagram thereof. The composite gate circuit 43 is made up of eight field effect transistors such as MOS transistors Q11–Q18.

Table 2 is a truth table of the composite the circuit 43 in which "1" corresponds to Vcc shown in FIG. 7B equal to, for example, 5 V, and "0" corresponds to Vss equal to, for example, 0 V.

TABLE 2

| Input | | | | Output |
|---|---|---|---|---|
| A1 | A2 | A3 | A4 | X |
| 1 | 1 | 1 | 1 | 0 |
| 1 | 1 | 1 | 0 | 0 |
| 1 | 1 | 0 | 1 | 0 |
| 1 | 1 | 0 | 0 | 1 |
| 1 | 0 | 1 | 1 | 0 |
| 1 | 0 | 1 | 0 | 0 |
| 1 | 0 | 0 | 1 | 0 |
| 1 | 0 | 0 | 0 | 1 |
| 0 | 1 | 1 | 1 | 0 |
| 0 | 1 | 1 | 0 | 0 |
| 0 | 1 | 0 | 1 | 0 |
| 0 | 1 | 0 | 0 | 1 |
| 0 | 0 | 1 | 1 | 1 |
| 0 | 0 | 1 | 0 | 1 |
| 0 | 0 | 0 | 1 | 1 |
| 0 | 0 | 0 | 0 | 1 |

Figure 3:
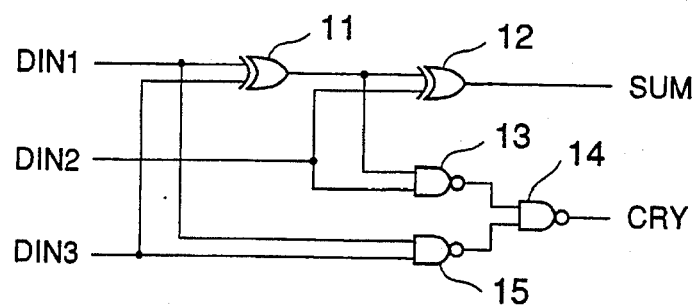
FIG. 3 is a block diagram of an adder used in the structure shown in FIG. 2.
Figure 8A:
FIG. 8A is a block diagram of a NAND circuit used in the structure shown in FIG. 3.
Figure 8B:
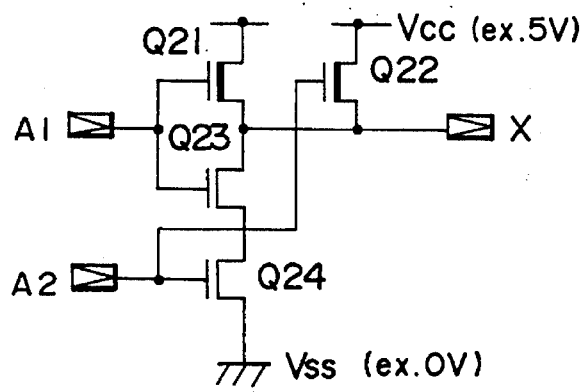
FIG. 8B is a circuit diagram of the NAND circuit shown in FIG. 8A.

FIG. 8A is a block diagram of each of the NAND circuits 13, 14 and 15 shown in FIG. 3, and FIG. 8B is a circuit diagram thereof. Each of the NAND circuits 13–15 is made up of four transistors Q21–Q24.

Table 3 is a truth table of each of the NAND circuits 13, 14 and 15 in which "1" corresponds to Vcc shown in FIG. 8B equal to, for example, 5 V, and "0" corresponds to Vss equal to, for example, 0 V.

TABLE 3

| Input | | Output |
|---|---|---|
| A1 | A2 | X |
| 1 | 1 | 0 |
| 1 | 0 | 1 |
| 0 | 1 | 1 |
| 0 | 0 | 1 |

The difference between the number of transistors forming the circuit shown in FIG. 3 and the number of transistors forming the circuit shown in 2FIG. 4A or 4B depends on the structure formed by three NAND gates 13–15 and the composite gate circuit 33 or 43. The gates 13–15 need 12 transistors in total, while the composite gate circuit 33 or 43 needs eight transistors. Hence, the circuit shown in FIG. 4A or 4B needs a smaller area on the chip and produces a decreased delay in signal propagation.

A description will now be given of a second embodiment of the present invention.

Figure 9:
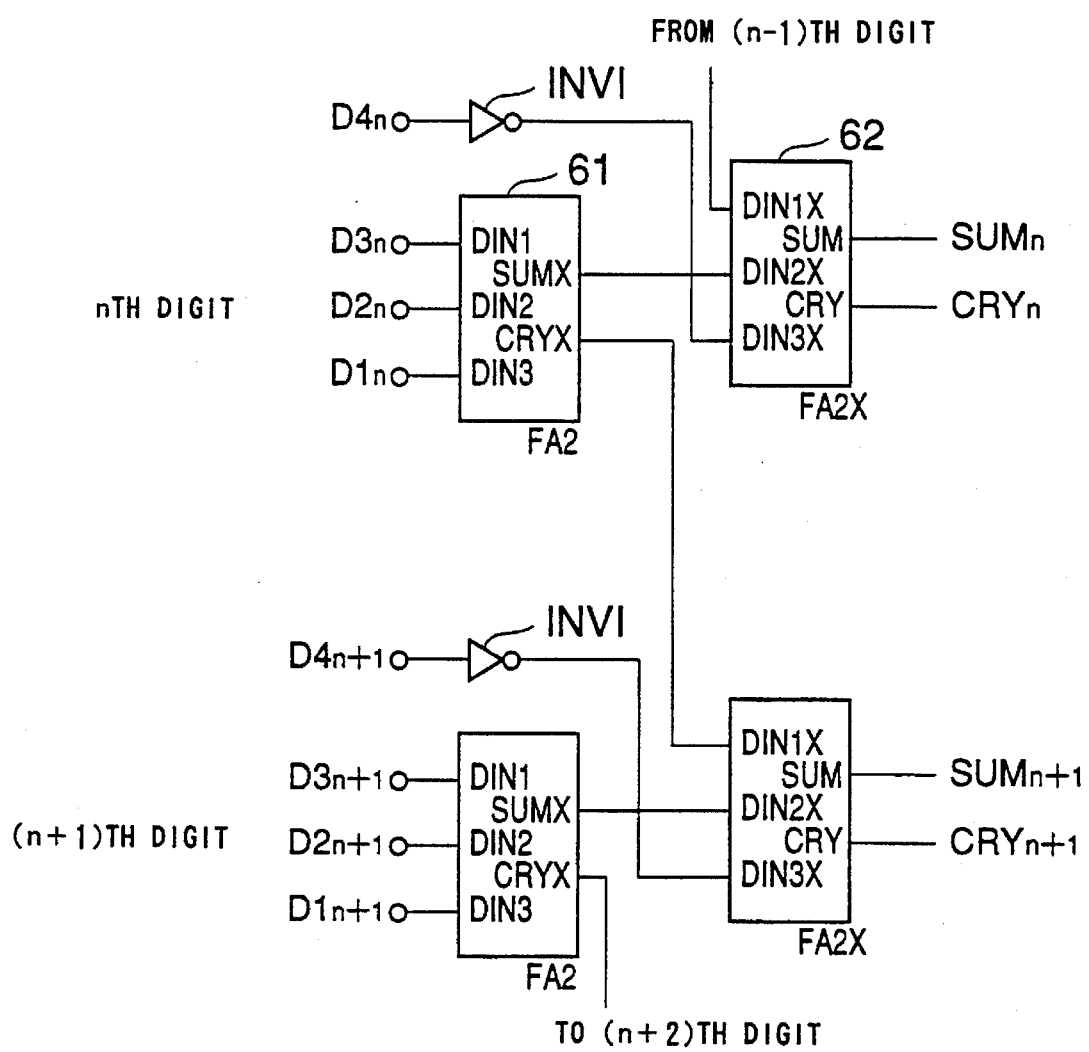
FIG. 9 is a block diagram of a second embodiment of the present invention.

FIG. 9 is a block diagram of the second embodiment of the present invention. More particularly, FIG. 9 shows a structure related to the nth and (n+1)th digits of a Wallence tree circuit which performs an adding operation on four operands, each of which consists of n digits. In order to obtain a sum result $SUM_n$ and a carry signal $CRY_n$ from positive-logic input signals $D1_n$–$D4_n$ of the n digits, two unit circuits are connected to extend over two stages. Each of the unit circuits includes a single full adder (FA2) 61 and a single full adder (FA2X) 62. The full adders 61 of the first stage receive the input signals $D1_n$–$D3_n$. Because the remaining input signal $D4_n$ is a positive-logic input, it is necessary to apply it to a positive-input type full adder (FA2). The full adders 61 respectively have three inputs, and the full adders 62 are of the negative-logic input type. Hence, the input signal $D4_n$ is applied to the full adder 62 via an inverter INV1.

The full adder 62 receives, in addition to the inverted version of the input D4n, the negative-logic output of the full adder 61 and a negative-logic carry signal from the (n−1)th digit. Then the full adder 62 outputs a positive-logic sum result $SUM_n$ and 10 a positive-logic carry signal $CRY_n$. The other digits are configured in the same way as the nth digit.

As shown in FIG. 9, if the input logic does not match the logic of the adders due to the number of inputs, inverters INV1 can be used to match the above logic. The structure shown in FIG. 9 employs the two types of full adders shown in FIGS. 4A and 4B, and hence has the same advantages as those which have been described previously. Particularly, each of the full adders utilizes all of the three inputs, and there is hence no redundancy in the circuit configuration. Due to the circuit configuration or the input logic, inverters can be provided in front of full adders FA2X.

Figure 10:
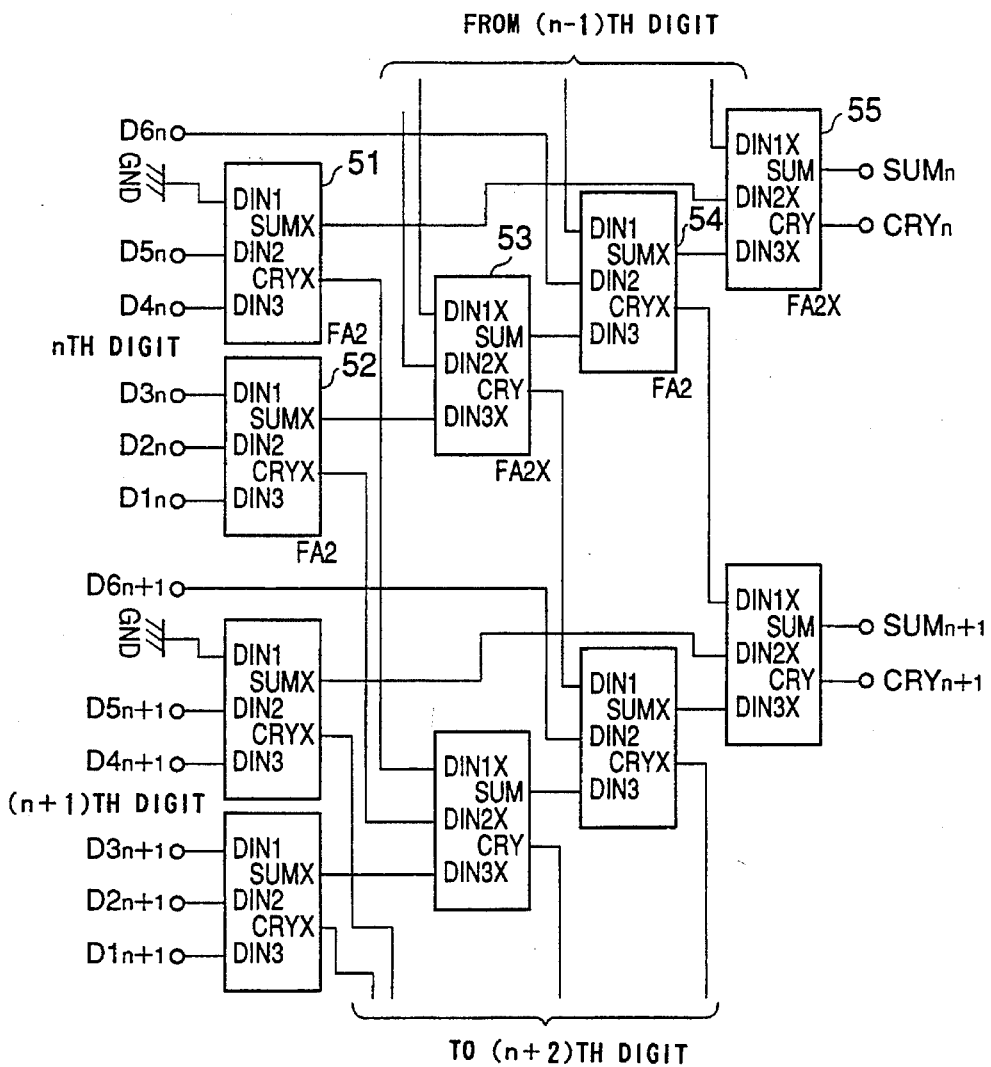
FIG. 10 is a block diagram of a third embodiment of the present invention.

A description will now be given of a third embodiment of the present invention with reference to FIG. 10. The third embodiment of the present invention includes another means for solving a situation in which the input logic does not match the logic of adders due to the number of inputs. In FIG. 10, parts that are the same as those shown in FIG. 5 are given the same reference numbers.

The circuit shown in FIG. 10 deals with six inputs $D1_n$–$D6_n$. In practice, there is a case where input values of some operands are known at particular digits. The structure shown in FIG. 10 is an example of such a case.

The input DIN1 of the full adder 51 of the nth digit is grounded, and the input signal $D6_n$ is applied to the full adder 54. The other parts of the circuit shown in FIG. 10 are the same as those of the circuit shown in FIG. 5. The other digits of the circuit according to the third embodiment of the present invention are configured in the same way as the nth digit thereof. Although there is a minor redundancy in use of full adders, matching between the input logic and the adder logic can be easily established by grounding some input terminals of adders. The third embodiment of the present invention employs the two types of full adders shown in FIGS. 4A and 4B, and thus has all the advantages of the first embodiment thereof.

In the circuit shown in FIG. 10, the redundant input terminals are grounded so that these terminals are set at the ground level ("0"). In some cases, redundant input terminals of full adders are fixed to the Vcc level (for example, 5 V). The full adders having redundant input terminals are not limited to those of the first stage, but can be located at the stages other than the first stage.

Figure 11:
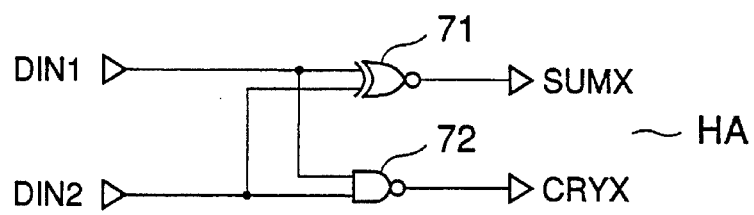
FIG. 11 is a block diagram of a half adder according to a fourth embodiment of the present invention.
Figure 12:
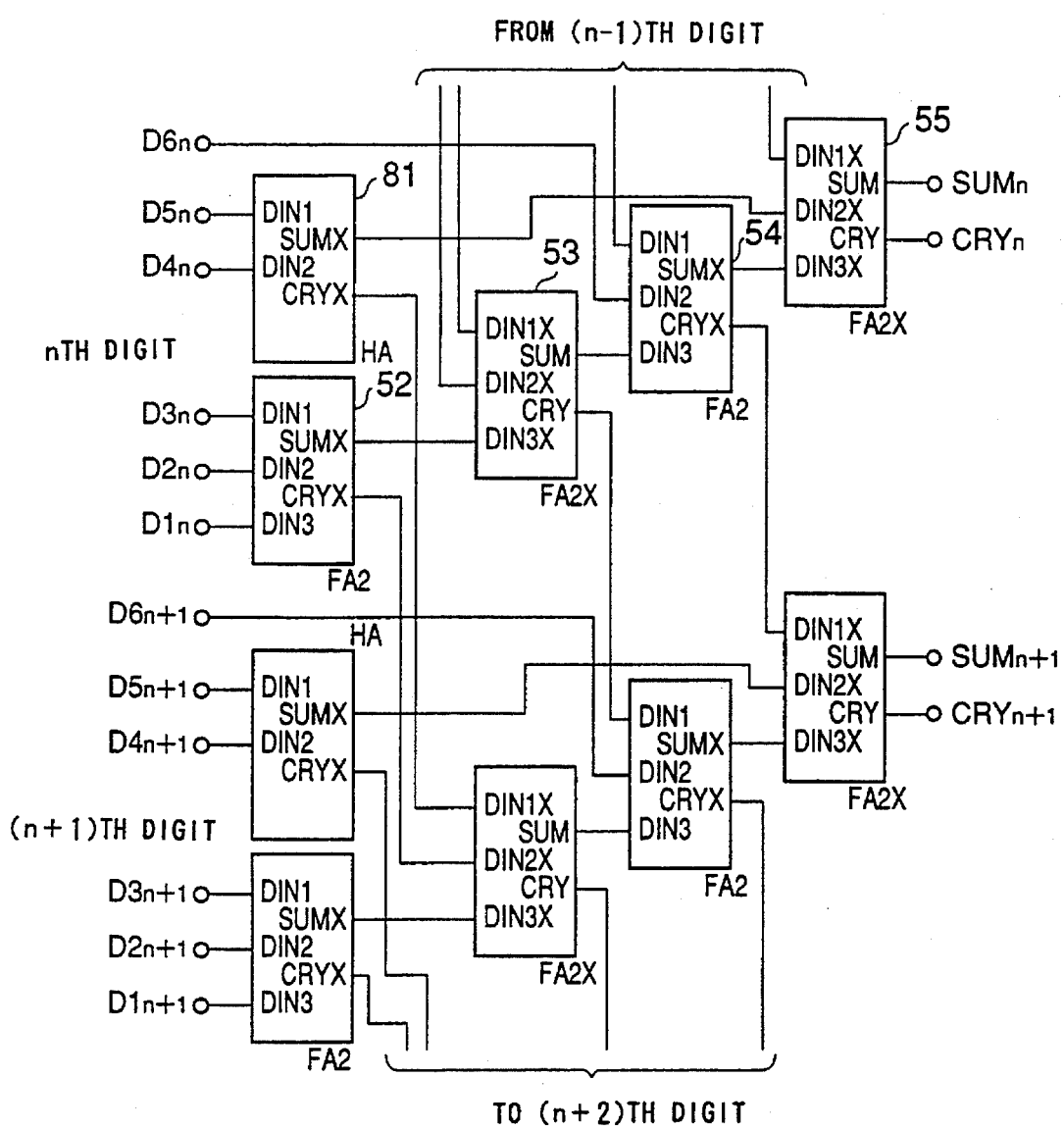
FIG. 12 is a block diagram of a Wallence tree circuit according to the fourth embodiment of the present invention.

A description will now be given, with reference to FIGS. 11 and 12, of a fourth embodiment of the present invention. FIG. 11 shows a half adder HA used for a Wallence tree circuit shown in FIG. 12. The fourth embodiment of the present invention is intended to employ means for solving a situation in which the input logic does not match the logic of adders due to the number of inputs. In this regard, the fourth embodiment of the present invention is the same as the second and third embodiments thereof. In FIG. 12, parts that are the same as those shown in the previously described figures are given the same reference numbers.

The half adder used in the fourth embodiment of the present invention and shown in FIG. 11 is replaced by the full adder having a redundant input terminal used in the circuit shown in FIG. 10. In FIG. 12, a half adder (HA) 81 located at the nth digit can be replaced by the full adder 51 shown in FIG. 10. The other parts of the circuit shown in FIG. 12 are the same as those of the circuit shown in FIG. 10.

The half adder HA shown in FIG. 11 is made up of an exclusive-NOR circuit 71 and a NAND circuit 72. Input signals DIN1 and DIN2 which are positive-logic inputs, are respectively applied to the exclusive-NOR circuit 71 and the NAND circuit 72, which output a negative-logic sum result SUMX and a negative-logic carry signal CRYX. When the half adder HA is formed by field effect transistors, the exclusive-NOR circuit 71 needs 10 transistors, and the NAND circuit 72 needs four transistors, as has been described previously.

According to the fourth embodiment of the present invention, it is possible to match the input logic with the logic of adders and to perform the operation at high speed.

The first through fourth embodiments of the present invention have been described. It should be noted that the Wallence tree circuits used in the first through fourth embodiments of the present invention are of the positive-logic-input/positive-logic-output type. Alternatively, by interchanging the two types of one-bit full adders FA2 and FA2X with each other, it is possible to provide a Wallence tree circuit of the negative-logic-input/negative-logic-output type. It is also possible to provide a Wallence tree circuit of a negative-logic-input/positive-logic-output type or a positive-logic-input/negative-logic output type by means of simple modifications.

The transistors used in the embodiments of the present invention are not limited to MOS transistors, but different types of transistors such as MIS (Metal Insulation Semiconductor) transistors or MES (MEtal Semiconductor) transistors can be used.

Figure 13:
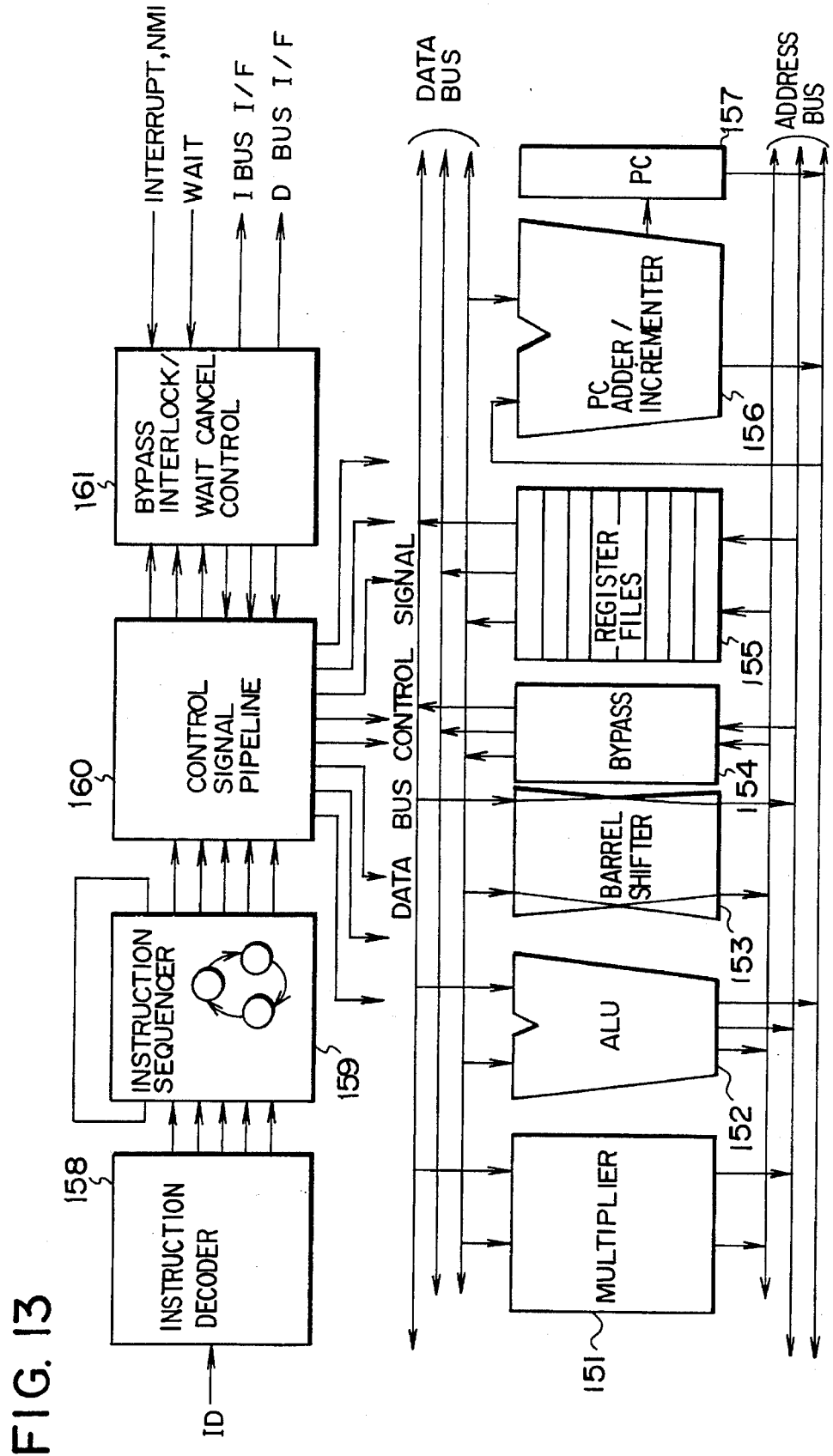
FIG. 13 is a block diagram of a processor having a multiplier having a Wallence tree circuit according to the present invention.

FIG. 13 is a block diagram of a processor having a multiplier utilizing the Wallence tree circuit according to the present invention. The structural elements themselves shown in FIG. 13 are known. The processor shown in FIG. 13 is characterized in that there is provided a multiplier 151 which utilizes the Wallence tree circuit according to the present invention. The processor includes an ALU 152, a barrel shifter 153, a bypass unit 154, register files 155, a PC (Program Counter) adder/incrementer 156, and a PC 157. Further, there are provided an instruction decoder 158, an instruction sequencer 159, a control signal pipeline unit 160, and a bypass interlock/wait cancel control 161. A data bus and an address bus are provided as shown in FIG. 13.

The multiplier 151 operates at a higher speed than the conventional multiplier and thus the processor having the multiplier 151 operates at a higher speed than the conventional processor having the conventional multiplier. Further, the multiplier 151 needs a smaller on-chip area than the conventional multiplier, and the processor having the multiplier 151 can be made more compact.

The present invention is not limited to the specifically disclosed embodiments, but variations and modifications may be made without departing from the scope of the present invention.

What is claimed is:

1. A logical operation circuit performing a logic operation on inputs, said logical operation circuit comprising:

a plurality of adders arranged in a tree structure, said plurality of adders including first-type adders and second-type adders, the first-type adders being adders which receive positive-logic inputs and output negative-logic outputs, the second-type adders being adders which receive negative-logic inputs and output positive-logic outputs.

2. The logical operation circuit as claimed in claim 1, wherein the first-type adders and the second-type adders are full adders.

3. The logical operation circuit as claimed in claim 2, further comprising an inverter provided in said tree structure, said inverter inverting one of the inputs and applying an inverted version of said one of the inputs to one of the plurality of adders.

4. The logical operation circuit as claimed in claim 3, wherein the plurality of adders include an adder which receives at least one of the inputs and has an input having a fixed level.

5. The logical operation circuit as claimed in claim 2, wherein the plurality of adders include an adder which receives at least one of the inputs and has an input having a fixed level.

6. The logical operation circuit as claimed in claim 1, further comprising an inverter provided in said tree structure, said inverter inverting one of the inputs and applying an inverted version of said one of the inputs to one of the plurality of adders.

7. The logical operation circuit as claimed in claim 6, wherein the plurality of adders include an adder which receives at least one of the inputs and has an input having a fixed level.

8. The logical operation circuit as claimed in claim 1, wherein the plurality of adders include an adder which receives at least one of the inputs and has an input having a fixed level.

9. The logical operation circuit as claimed in claim 1, wherein the plurality of adders include full adders and half adders.

10. A device comprising:

a multiplier; and buses via which data is applied to the multiplier and data is output from the multiplier, said multiplier performing a multiplying operation on the data, said multiplier comprising:

a plurality of adders arranged in a tree structure, said plurality of adders including first-type adders and second-type adders, the first-type adders being adders which receive positive-logic inputs and output negative-logic outputs, the second-type adders being adders which receive negative-logic inputs and output positive-logic outputs.

* * * * *